Figure 1:
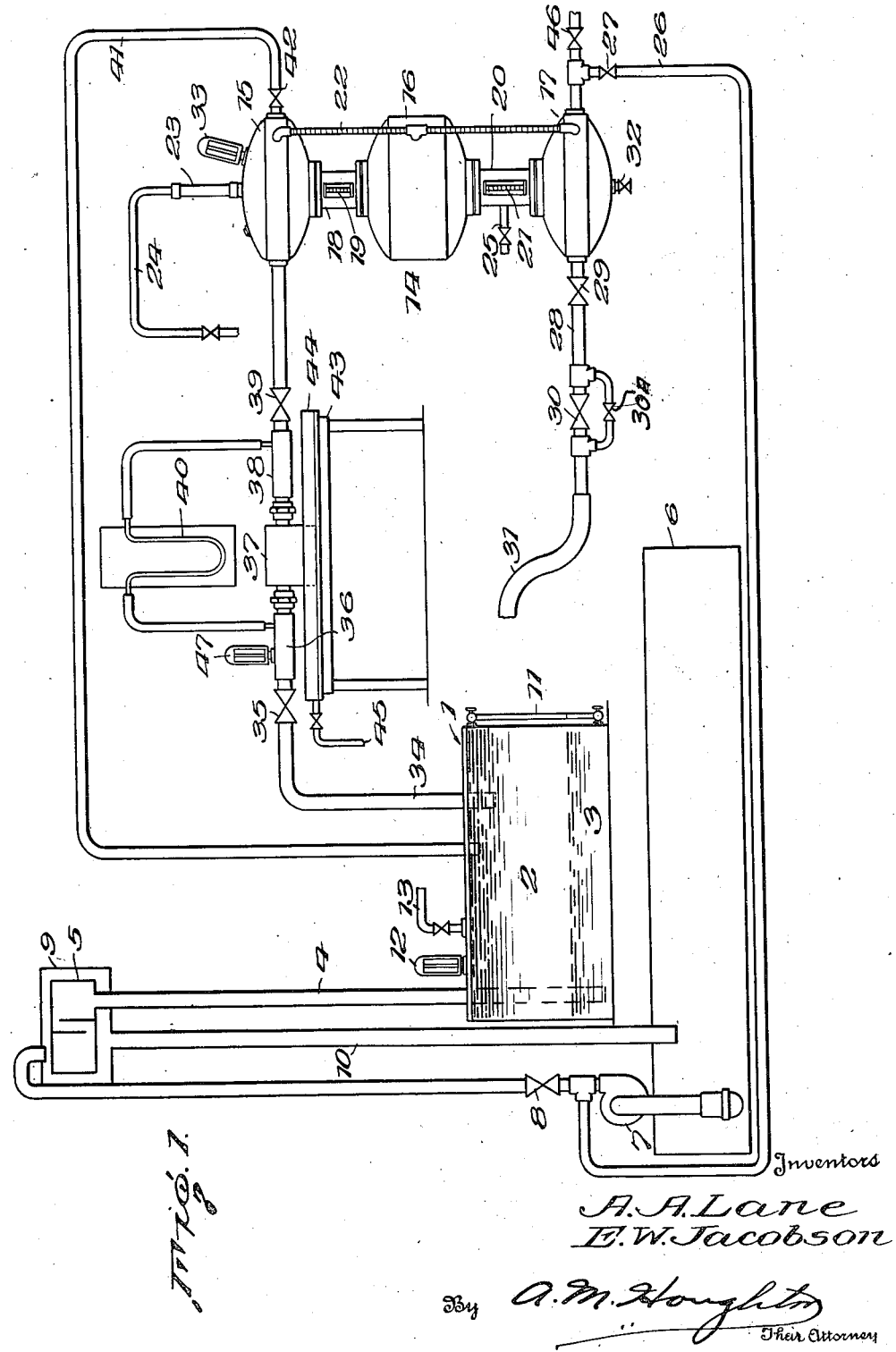

Patented Aug. 11, 1936

2,050,800

UNITED STATES PATENT OFFICE 2,050,800

METER TESTING

Abbot A. Lane, Aspinwall, and Eugene W. Jacobson, Oakmont, Pa., assignors to Gulf Research & Development Company, Pittsburgh, Pa., a corporation of Delaware Application November 5, 1934, Serial No. 751,622

20 Claims. (Cl. 73—51)

This invention relates to improvements in meter testing and more particularly it pertains to a method of and apparatus for testing liquid flow meters.

Among the objects achieved in the present invention are the provision of a method for testing meters embodying the prevention of error resulting from evaporation of the liquid used to test the meter, from air or other gas being entrained in liquid used to test the meter or from volumetric changes due to temperature variations; the provision of a meter testing method avoiding deterioration of the test fluid; and the provision of simple, inexpensive and accurately operating apparatus for testing liquid meters.

With these and other objects in view, the invention consists in a method of and means for testing liquid meters wherein bodies of the liquid for the test are maintained inside of two interconnected vessels out of contact with the air and in contact with a second liquid, immiscible with and of different density than the liquid passed through the meter during the test. One of these vessels is a storage tank for the test liquid and the other a volume measuring receptacle. Passage of the test liquid in either direction from one vessel to the other is accomplished by exerting pressure on the second immiscible liquid in one vessel or the other, depending upon the direction of flow desired. For the purpose of testing liquid meters two interconnecting conduits are provided; one for passage of the liquid used for the test from one vessel to the other through the meter to be tested and the other for return of the liquid so passed from the second vessel to the first independently of the meter. The volume-measuring receptacle is provided with a sight gauge whereby the point of contact between the two liquids therein is made visible; changes in the level of this point of contact giving an indication of liquid displacement within the volume measuring receptacle. In testing, a certain volume of test liquid is forced from the storage tank through the meter into the volume-measuring receptacle where the volume of immiscible liquid displaced is accurately measured by means of change of level in the sight gauge. When the metered volume of liquid has been checked by the volume-measuring receptacle, it is returned to the storage tank through the return conduit by exerting pressure on the immiscible liquid in contact with the test liquid in the volume-measuring receptacle. Direction and rate of flow are controlled by means of suitable valves in the various conduits. Alternatively, in testing, liquid to be metered may be forced from the volume measuring receptacle through the meter to the storage vessel; the meter reading being checked against the amount of liquid which has been displaced from the volume measuring device and then that volume returned to the volume measuring receptacle through the return conduit. The result is the same whether the testing liquid is passed from a storage tank through the meter to displace liquid in a volume measuring device or whether a measured volume is passed from a volume measuring receptacle through the meter to storage.

Air entrainment is prevented by maintaining the liquid to be metered in a continuous liquid phase from the body in the storage tank through the meter to the body in the volume measuring receptacle.

Advantageously, thermometers are provided for reading the temperature of the liquid used for the test at the storage tank, in the opposite side of the meter from the volume-measuring receptacle, and at the volume-measuring receptacle, whereby volumetric changes in the liquid due to thermal changes in passing from the storage tank to the volume-measuring receptacle may be calculated and thus eliminated as a source of error in comparing volume changes in the volume-measuring receptacle with the volume indicated by the meter.

The principle upon which the invention works may be readily understood by reference to the accompanying drawings wherein are illustrated more or less diagrammatically two specific forms of apparatus embodiment within the purview of our invention and capable of operating our process.

Figure 2:
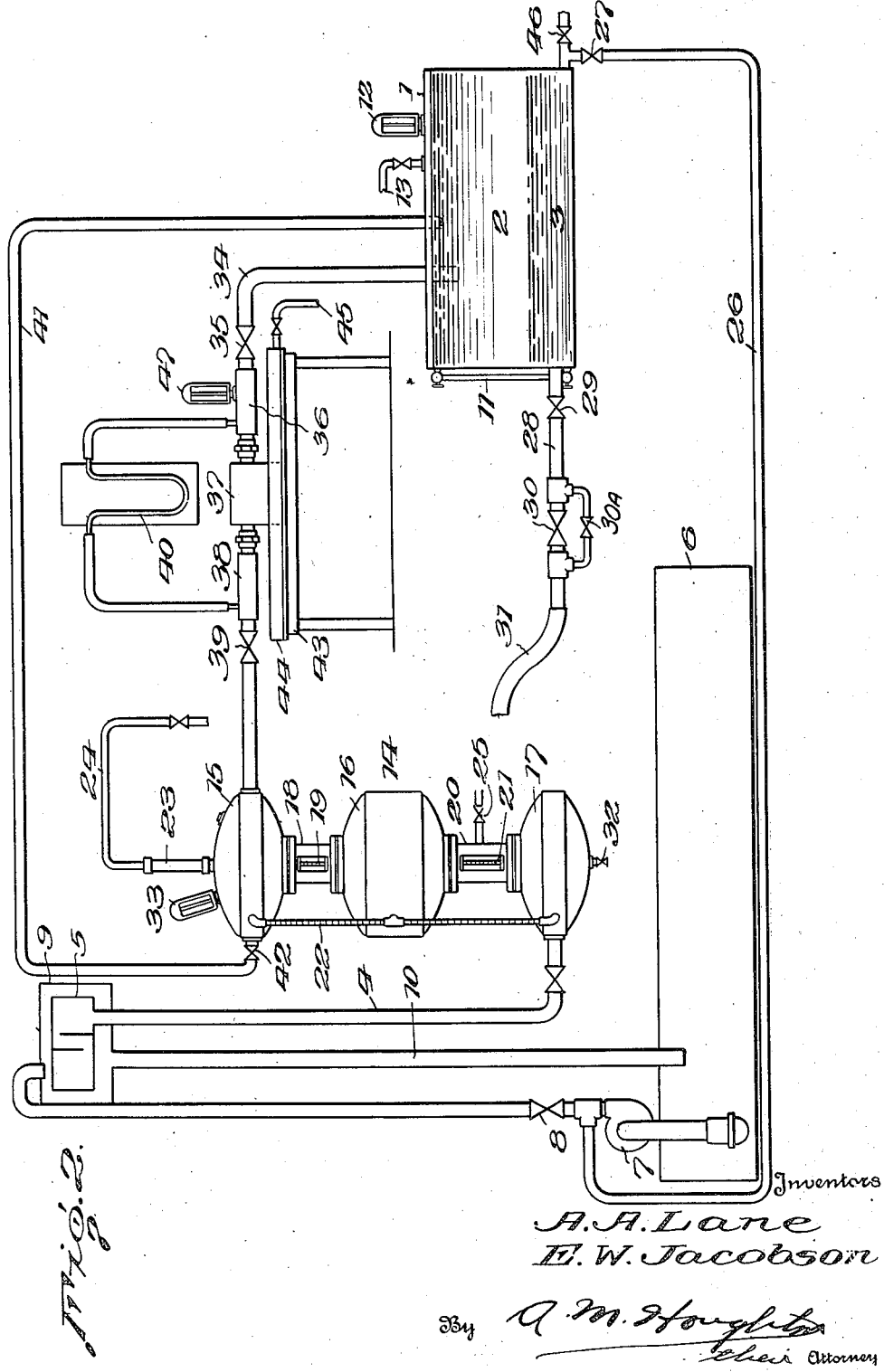

In the drawings, Fig. 1 is a schematic view showing one organization of such apparatus and, Fig. 2 is a similar view showing a modified organization of apparatus elements similar to those shown in Fig. 1 but adapted to perform the method in a slightly different manner.

Referring to the drawings and particularly to Fig. 1, reference character 1 indicates in general a closed supply tank for the liquid used for the test which in this particular instance is a body of gasoline 2 in contact with and supported by a body of water 3. Water is supplied to the lower portion of the tank 1 through a conduit 4 communicating with an overhead tank 5 open at the top and adapted to maintain a constant head of water on the gasoline in the storage tank 1. The tank 5 is supplied with water from a water storage tank 6 through the media of a force pump 7 and valved pipe 8 which discharges into the top of the tank. Excess water from the tank 5 overflows at the top of the tank into container 9 and is returned to the water storage tank 6 through a return pipe 10. Sight gauge 11 is provided for indicating the level between gasoline and water in the tank 1 and a thermometer 12 indicates the temperature of the gasoline therein. A valved vent 13 is provided for removing any entrained gases, such as air. A volume-measuring receptacle indicated in general at 14 comprises a tank having an upper bell 15, middle bell 16 and lower bell 17. Interposed between and connecting bells 15 and 16 is a cylindrical portion 18 containing a sight gauge 19 suitably graduated for the accuracy of measurement desired. A similar cylindrical portion 20 containing sight gauge 21 is interposed between bells 16 and 17. A separate sight glass 22 connecting the upper bell 15 and lower bell 17 is provided for the indication of levels outside the ranges of glasses 19 and 21.

The curved heads of the measuring tank bells direct any entrained gas bubbles up through the liquid in the tank into a narrow glass passage 23 above the top bell where it is readily observed by the operator. In effect, the passage is a gas trap. Air or other gas in the glass 23 may be bled off through a valved vent line 24. A valved bleed vent 25 is provided on one side of the sight gauge 21 for the purpose of removing any bubbles, dirt or other contamination which may collect at this point causing difficulty in accurately gauging dividing levels in the glass. Water is supplied to the lower bell 17 of the measuring tank through a conduit 26 leading from the water storage tank 6 through force pump 7 and provided with valve 27. Water is discharged from the lower bell 17 through an outlet 28 provided with a flow-regulating valve 29 and quick acting valves 30 and 30A. The outlet 28 terminates in a discharge member 31, the opening of which is adjustable at different levels and spills discharged water into water storage tank 6. The volume measuring tank 14 is provided at the base with a drain cock 32 and carries thermometer 33 in the upper bell 15 for indicating the temperature of gasoline therein. Gasoline flows from the supply tank 1 through conduit 34, valve 35 and pressure tube 36 to the meter to be tested 37 and leaving the meter continues its flow through pressure tube 38 and valve 39 to the top bell 15 of the volume measuring receptacle 14. The pressure tubes 36 and 38 each contain piezometer rings and Pitot tubes. Pressure drop through the meter being tested is determined by a differential manometer 40 shunted across pressure tubes 36 and 38. A return conduit 41 provided with valve 42 enables gasoline to be returned from the top bell 15 back to the storage tank 1. The meter 37 may be supported on a table 43 provided with a catch basin 44 and drain 45. Makeup water may be supplied to the system through the valved inlet 46. A thermometer 47 is placed in tube 36 to afford accurate determination of the temperature of liquid entering the meter.

At the start of a meter testing operation, the meter 37 to be tested is connected in the position shown in the drawings, the pump started and the dividing level between water and gasoline in the volume-measuring tank 14 is set at a predetermined level in sight gauge 19 by proper manipulation of valves 27, 42, 30 and 30A, valve 39 in the meter line being closed during this manipulation. The valve in the pipe 8 is open and as no gasoline is being displaced the water being pumped into the overhead tank 5 overflows into container 9 and is returned to the storage tank 6.

Valves 35 and 39 are next opened and valves 27, 42, 30 and 30A closed. Valve 29 is adjusted to give the proper rate of flow through the meter and the meter register is set at zero. To perform the test on the meter, quick acting valve 30 or small quick acting valve 30A is opened long enough to allow a predetermined amount of gasoline to pass from the supply tank on through the meter 37 into the upper bell 15 of the measuring tank, the increase in volume in the latter causing displacement of water downwardly in the volume measuring receptacle, the water discharging through member 31 into the storage tank 6. The flow of gasoline is caused by displacement of gasoline in tank 1 by the body of water 3 under the constant head imposed by the tank 5. During this procedure, the dividing level in measuring tank 14 has lowered to some point within the lower sight gauge 21. If the metered volume of gasoline is exactly the same as the volume of the measuring tank between the predetermined levels in gauges 19 and 21 the final dividing level between gasoline and water will be at the predetermined level in gauge 21. If the two volumes are not the same however, the reading of the gauge 21 at the dividing level will give the error of measurement of the meter for the amount passed through the meter at the rate of flow for the test run. Correction for volumetric changes between the storage tank 1 and measuring tank 14 due to changes in temperature may be calculated with the aid of thermometers 12, 33 and 47. After the test run, the gasoline which has been passed into the measuring tank 14 during the run is returned to the storage tank through the return line 41 by closing valves 8 and 39 while opening valves 27 and 42. This causes water from the pump 7, under pressure, to displace gasoline upwardly in the measuring tank 14 to its original level in the sight gauge 19. The excess gasoline returns through line 41 to the storage tank 1 where it displaces water upwardly through pipe 4 into tank 5, finally overflowing into the container 9 and returning to storage tank 6.

The apparatus shown in Fig. 1 is capable of testing meters by a reverse operation, namely; by forcing gasoline in the volume-measuring receptacle 14, through conduits 38 and 36 to the storage vessel 1 and checking the meter reading against the volume displaced from the volume measuring device as indicated by the change of liquid dividing level therein. Any liquid so passed is returned to the volume-measuring receptacle through conduit 41. However, when it is desired to pass liquid from the volume measuring device through the meter to the storage vessel, we find it advantageous to use the apparatus organization shown in Fig. 2 of the drawings.

In Fig. 2 of the drawings there is illustrated a modified form of apparatus wherein are present the same elements as shown in Fig. 1, but these elements are organized and connected in a different manner in order to facilitate measurement of the test liquid prior to passing it through the meter.

Referring particularly to Fig. 2, the following differences distinguish from the organization shown in Fig. 1. It will be noted that the conduit 4, connecting with the constant level tank 5, connects with the lower bell 17 of the volume measuring receptacle 14, while conduit 26 leading from the water storage tank 6 through force pump 7 is connected to supply water to the storage tank 1. The outlet 28 with quick acting valves 30, 30A and adjustable discharge member 31 is provided for the body of water 3 in the storage tank.

With the above stated changes in apparatus organization we are enabled to pass liquid used for the test under a constant head from the volume measuring receptacle through the meter to be tested to the storage tank and, having checked the meter reading against the liquid displaced from the volume measuring receptacle, to lead the liquid so passed back to the volume measuring receptacle through return conduit 41.

In both of the modifications shown by Figs. 1 and 2, liquid passing through the meter is subjected to a constant head by means of the constant level tank 5.

Air entrainment is prevented by inserting the ends of pipes 34 and 41 into the tank 1 so that any air which may get into the tank 1 will collect at the top where it may be removed through the vent pipe 13.

During initial test runs air is often present in the passage 23 until the meter being tested has been swept free of air. This freeing the meter of air ordinarily takes two or three runs after which succeeding runs will show the system to be free of air. Air in the passage 23 is let off through the vent 24.

Advantageously, the gasoline used in testing may be colored with a dye insoluble in water, thereby facilitating easy determination of the dividing levels in the sight gauges. The head of water under which the system operates in flowing gasoline from the storage tank to the meter may be varied by adjusting the level of member 31 while adjustment of the pressure imposed in returning gasoline from the measuring tank 14 to the storage tank 1 may be accomplished by adjustment of the valve 8.

Various changes may be made in the mode of operation and in the details of apparatus without departing from the scope of the invention. For instance while we have described in particular a method wherein gasoline used in testing the meter is displaced with water, the invention is equally well adapted for testing meters with liquids other than gasoline and displacing with liquids other than water. While the apparatus illustrated is adapted for testing with a liquid lighter than the immiscible liquid used to displace it, the apparatus may be easily changed with slight alteration to adapt it for testing with a liquid heavier than the immiscible liquid used to displace it.

In our invention, evaporation of gasoline is prevented by keeping the gasoline free from contact with air throughout the system.

What we claim is:—

1. A method of testing liquid meters which comprises the steps of first establishing and maintaining a supply body of liquid for which the meter is to be tested, establishing and maintaining a body of a second liquid in a volume-measuring receptacle, said second liquid being immiscible with and of different density than said first liquid, establishing and maintaining a second body of the first liquid in contact with said second liquid, establishing and maintaining liquid communication between said supply body and one side of the meter to be tested, establishing and maintaining liquid communication between the other side of said meter and said second body of the first liquid and, second displacing a volume of said first liquid from one body through said meter to the other body while displacing said second liquid from said other body to compensate for change of volume of the first liquid in said other body whereby the volume of first liquid passed through the meter as indicated by the change in level of the liquids in the volume measuring receptacle may be compared with the volume recorded by said meter.

2. A method of testing liquid meters which comprises the steps of establishing and maintaining a supply body of liquid for which the meter is to be tested, establishing and maintaining a body of a second liquid in contact with said supply body of first liquid, said second liquid being of different density than and immiscible with said first liquid, establishing and maintaining a second body of said second liquid in a volume-measuring receptacle, establishing and maintaining a second body of the first liquid in contact with the second body of the second liquid, establishing and maintaining liquid communication between said supply body and one side of the meter to be tested, establishing and maintaining liquid communication between the other side of said meter and the second body of the first liquid, and forcing a measured volume of said first liquid from one body through said meter to the other body, whereby the measured volume of first liquid passed through the meter as indicated by the change in level of the liquids in the volume measuring receptacle may be compared with the volume recorded by said meter, said forcing being accomplished by displacement of the first liquid with said second liquid.

3. In the testing of meters for gasoline, the method which comprises forcing gasoline from a supply body through the meter to be tested to a second body of gasoline, at least one of said bodies of gasoline being in contact with a body of water in a volume measuring receptacle, said forcing of the gasoline through the meter being accompanied by displacement of one of said liquids in the measuring receptacle and a consequent change in the level of the dividing line between the liquids in said receptacle, whereby the volume of gasoline forced through the meter as indicated by the change in level of the liquids in the volume measuring receptacle may be compared with the volume recorded by the meter.

4. The method of testing liquid meters which comprises the steps of establishing and maintaining a supply body of liquid used to test the meter, establishing and maintaining a second body of said liquid in a volume measuring receptacle, establishing and maintaining a body of a second liquid in contact with said supply body of the first liquid, said second liquid being immiscible with and of different density than said first liquid, establishing and maintaining a second body of said second liquid in contact with said second body of first liquid in the volume measuring receptacle, establishing and maintaining liquid communication between the said supply body and said second body of first liquid through the meter to be tested, establishing and maintaining liquid communication between said supply body and said second body of first liquid independently of the meter, displacing a measured volume of said first liquid from one body to the other by forcing the first liquid from one body through said meter to the other body whereby the volume change of said first liquid in the volume measuring receptacle may be compared with the volume recorded by the meter and returning said first liquid to the body from which it was displaced by forcing it through said liquid communication independently of the meter, said forcing being accomplished by displacement of the first liquid by said second liquid.

5. Apparatus for testing gasoline flow meters comprising a closed container for gasoline, a closed volume-measuring receptacle, a conduit connecting the upper portion of said container with one side of the meter to be tested, a conduit connecting the other side of said meter to be tested and the upper portion of said volume-measuring receptacle, a conduit directly connecting the upper portions of said container and said volume-measuring receptacle, means communicating with the bottom of said container and said volume measuring receptacle, for alternately charging said container with water, while discharging water from said receptacle and charging said receptacle with water while discharging water from said container, and means in said conduits and in said water charging and discharging means for the container and receptacle for controlling the flow of liquid in the system.

6. Apparatus for testing gasoline flow meters comprising a closed container for gasoline, a volume-measuring receptacle, a liquid conduit connecting the upper portion of said container with one side of the meter to be tested, a liquid conduit connecting the other side of the meter of be tested and the upper portion of said volume-measuring receptacle, a liquid conduit directly connecting the upper portions of said container and said volume-measuring receptacle, means at the bottom of said container communicating with a source of water under constant pressure, means at the bottom of said volume-measuring receptacle communicating with a source of water under greater pressure than said first named source, an outlet at the bottom of said volume-measuring receptacle and means in said conduits, said second named communicating means and said outlet for controlling the flow of liquid therein.

7. The apparatus of claim 6 wherein said source of water under constant pressure comprises an elevated, water-holding receptacle adapted to maintain a body of water at a constant level over said closed container.

8. Apparatus for testing gasoline flow meters comprising a container for gasoline, a closed volume-measuring receptacle, a liquid conduit connecting the upper portion of said container with one side of the meter to be tested, a liquid conduit connecting the other side of the meter to be tested and the upper portion of said volume-measuring receptacle, a liquid conduit directly connecting the upper portions of said container and said volume-measuring receptacle, means at the bottom of said volume-measuring receptacle communicating with a source of water under constant pressure, means at the bottom of said container communicating with a source of water under greater pressure than said first named source, an outlet at the bottom of said container and means in said conduits, said communicating means and said outlet for controlling the flow of liquid therein.

9. The apparatus of claim 8 wherein said source of water under constant pressure comprises an elevated, water-holding receptacle adapted to maintain a body of water at a constant level over said closed volume measuring receptacle.

10. Apparatus for the testing of liquid flow meters comprising a closed container holding liquid to be metered, a closed measuring tank adapted to hold a body of said liquid to be metered in contact with a second liquid immiscible with and of different density than the liquid to be metered, a liquid conduit connecting the body of liquid to be metered in said container with the body of the liquid to be metered in the volume-measuring tank through the meter to be tested, means for displacing liquid to be metered from one body through the meter to the other body, said measuring tank being provided with means for ingress or egress of the second liquid in proportion to displacement of the liquid to be metered, a gauge in said measuring tank for observing the dividing level of the immiscible liquids therein and a scale on said gauge for measuring the volume between different dividing levels in said measuring tank.

11. Apparatus according to claim 10 wherein is provided a valved return conduit for liquid to be metered connecting said tank and said container and by-passing said meter for controlling flow of liquid therein.

12. Apparatus for the testing of liquid flow meters comprising a container holding a body of liquid to be metered, a closed measuring tank holding a definite volume of liquid, part of said volume being a body of said liquid to be metered and part a body of second liquid held in contact with, immiscible with, and of different density than said liquid to be metered, a liquid conduit connecting the body of liquid to be metered in the container with the body of liquid to be metered in the volume measuring tank, said liquid conduit being adopted to contain a meter to be tested, a gauge in said measuring tank for observing the dividing level of the immiscible liquids therein, a scale on said gauge for measuring the volume between different dividing levels in said measuring tank, and means to displace liquid to be metered from one body through the meter to the other body, said measuring tank being provided with means for ingress and egress of said second liquid to keep the total volume of liquid in the measuring tank constant.

13. Apparatus for testing gasoline flow meters comprising a closed container for gasoline, a volume measuring receptacle, a liquid conduit connecting the upper portion of said container with one side of the meter to be tested, a liquid conduit connecting the other side of the meter to be tested and the upper portion of said volume measuring receptacle, means at the bottom of said container communicating with a source of water under constant pressure, means at the bottom of said volume measuring receptacle communicating with a source of water under greater pressure than said first named source, an outlet at the bottom of said volume measuring receptacle and means in said conduits; said second named communicating means and said outlet for controlling the flow of liquid therein.

14. Apparatus for testing gasoline flow meters comprising a container for gasoline, a closed volume measuring receptacle, a liquid conduit connecting the upper portion of said container to one side of the meter to be tested, a liquid conduit connecting the other side of the meter to be tested and the upper portion of said volume measuring receptacle, means at the bottom of said volume measuring receptacle communicating with a source of water under constant pressure, means at the bottom of said container communicating with a source of water under greater pressure than said first named source, an outlet at the bottom of said container and means in said conduits, said communicating means and said outlet for controlling the flow of liquid therein.

15. Apparatus according to claim 10 wherein the closed measuring tank is provided with upwardly curved inner spaces, a narrow passage at the top of said tank, said passage being in communication with said inner surfaces, a window in said passage and means for withdrawing accumulated gas from said passage and inner surfaces of said tank.

16. Apparatus according to claim 10 wherein the closed measuring tank is provided at its top with a dome shaped inner surface, a narrow trap opening into the apex of the dome, a window in said trap and means for removing gases accumulating in said trap.

17. Apparatus according to claim 10 wherein the closed measuring tank is provided with a lower inverted dome shaped portion, an upper dome shaped portion superimposed thereon, an opening in the apex of said upper portion, a gas trap communicating with said opening and means to remove gases accumulating in said trap.

18. The method of testing liquid meters, which comprises forcing liquid from a supply body through the meter to be tested and into a second body of said liquid, one of said bodies of liquid being disposed within a standard measuring receptacle containing a second liquid immiscible with said first liquid and of different density than said first liquid whereupon visible indicating means is established at the dividing line between the liquids, noting the position of said dividing line and the quantity of liquid recorded by the meter, forcing a further quantity of liquid through the meter with consequent displacement of one of said liquids from said standard measuring receptacle, said quantity of liquid displaced from said receptacle being equal to the quantity of liquid passed through the meter, noting the change in position of the dividing line between the liquids in the standard measuring receptacle, and again reading the meter whereby the volume of liquid represented by the change in the position of dividing line may be compared with the volume of liquid recorded by the meter between said first and second meter readings.

19. The method of testing meters for volumetric measuring of gasoline which comprises establishing and maintaining a body of gasoline in communication with said meter, establishing and maintaining a body of water in contact with said body of gasoline on one side of said meter in a volume measuring receptacle, forcing a quantity of said gasoline through the meter, and determining the quantity of gasoline forced through the meter by noting the change in level of the dividing line between the body of water and the gasoline in the volume measuring receptacle whereby the volume of gasoline so obtained may be compared with the volume of gasoline recorded by the meter.

20. The process of testing volumetric liquid meters which comprises forcing through such a meter liquid normally measured thereby by the pressure of a second liquid of different density and immiscible therewith, delivering the liquid forced through said meter to a closed receptacle containing a supply of said second liquid, and determining a certain volume of the first liquid delivered to said receptacle whereby said volume of liquid delivered to said receptacle may be compared with the reading of the meter for checking purposes, and displacing from said second receptacle an amount of said immiscible liquid corresponding to the amount of the first said liquid delivered thereto from the meter, whereby the liquid which is being used for testing the meter is kept out of contact with the atmosphere on both sides thereof.

ABBOT A. LANE.
EUGENE W. JACOBSON.